United States Patent [19]

Yoshigai

[11] Patent Number: 5,133,432
[45] Date of Patent: Jul. 28, 1992

[54] CANTILEVER BRAKE FOR TWO WHEELED VEHICLES WITH A CURVED CANTILEVER MIDDLE PORTION

[75] Inventor: Kenichi Yoshigai, Osaka, Japan

[73] Assignee: Yoshigai Kikai Kizoku Co., Ltd., Osaka, Japan

[21] Appl. No.: 604,204

[22] Filed: Oct. 29, 1990

[30] Foreign Application Priority Data

Oct. 27, 1989 [JP] Japan .................................. 1-280618

[51] Int. Cl.⁵ .................................................. B62L 3/00
[52] U.S. Cl. .................................. 188/24.21; 188/24.22
[58] Field of Search ............... 188/24.21, 24.22, 24.14, 188/24.12, 24.11, 2 D, 247, 250 F, 250 G, 250 B, 234, 245

[56] References Cited

U.S. PATENT DOCUMENTS 4,597,474  7/1986  Nagano .................... 267/155 X
4,972,927  11/1990  Stephens et al. ................. 188/24.12

FOREIGN PATENT DOCUMENTS 1000840  2/1952  France ........................ 188/24.22

*Primary Examiner*—Robert J. Oberleitner
*Assistant Examiner*—Josie A. Ballato
*Attorney, Agent, or Firm*—Sixbey, Friedman, Leedom & Ferguson

[57] ABSTRACT

A brake device having a pair of cantilevers each of which is connected to an arch wire by a wire connector and which carries a brake shoe assembly. The middle portion of each cantilever is curved away from the fork upon which it is mounted so that the wire connector of the cantilever and the stem of the brake shoe assembly are located on an extension line of the arch wire when viewed from a lateral side of the brake device, thereby reducing the moment developed between these parts. The mount shaft for the brake shoe stem of each brake shoe assembly is inserted into the cantilever from a side of the cantilever that faces the fork and is fastened by a fixing nut at an opposite side of the cantilever, thereby improving serviceability.

5 Claims, 3 Drawing Sheets

CANTILEVER BRAKE FOR TWO WHEELED VEHICLES WITH A CURVED CANTILEVER MIDDLE PORTION

FIELD OF THE INVENTION AND RELATED STATEMENT

The present invention relates to a brake device for a two-wheeled vehicle.

There is known a brake device of the cantilever type for a two-wheeled vehicle, typically a bicycle, the left half of which is shown in FIG. 5.

Such a brake device, conventionally, has a pair of right and left cantilevers 2 pivotally that are carried by the front part of a fork supporting the front wheel 1 via pedestals. The cantilevers 2 are provided with wire connectors 3 which interconnect an arch wire 4. The middle portion of each cantilever 2 receives a mount shaft 5 inserted into and fastened to it from the front side. The stems 7 of a pair of right and left brake shoes 6 are then inserted into and secured to the mount shafts 5 in front of the cantilevers 2. When applying a brake with this structure, the cantilever pair 2 is swung toward the front wheel 1 around the pedestal axes by way of the arch wire 4 so that the brake shoes are pressed against the rim of the front wheel 1 from the right and left sides.

Such conventional brake devices are associated with the following three problems. First of all, the stem 7 of each brake shoe 6 is located at the longitudinally middle portion so that an enormous stress develops at the fixing joint between a shoe holder 9 receiving the shoe 8 and the stem 7 during braking, and is likely to cause damage or breakage of the parts. Specifically, such a flapping effect that the front of the brake shoe pair 6 expands outward as indicated by a phantom line happens during braking because of the friction between the wheel rim and the shoe 8. Since the stem 7 is conventionally located at the middle of longitudinal direction as mentioned above, the moment at that time is maximized, overloading the fixing joint between the stem 7 and the shoe holder 9.

Secondly, since the mount shaft 5 is inserted from front into the cantilever 2 and fastened to its rear end by screwing a fixing nut 10, it is necessary to turn the fixing nut 10 in a small space between the cantilever 2 and the fork, which is a very difficult job by its nature.

Thirdly, the conventional cantilever 2 is substantially linear upwardly from the pivoted point when viewed from the side. The wire connector 3 and the stem 7 of the brake shoe 6 are therefore apart from each other at a distance L in the longitudinal direction. As a result, a moment corresponding to the distance L develops in this space so that flexing of the cantilever 2 or other similar effects prevent the device from providing a satisfactory braking force.

OBJECTS AND SUMMARY OF THE INVENTION

In view of the foregoing problems herein described, the present invention has an object to reduce the load applied to the fixing joint for the stem to provide an improved serviceability during building the mount shaft, while also ensuring a sufficient braking effect.

In order to achieve the foregoing object, the present invention provides the following means: The first means comprises, in a two-wheeled vehicle brake device including a pair of right and left cantilevers pivotally carried at the front part of a from fork supporting a front wheel by way of pedestals, an arch wire connected to the ends of said cantilever pair, a longitudinally extending mount shaft inserted into and fastened to each said cantilever, and a pair of right and left brake shoe assemblies each having a stem received by said mount shaft, the arrangement wherein said stem is located rear of the longitudinal middle of said brake shoe, said mount shaft is inserted into each said cantilever from the rear thereof and is fastened thereto by means of a front-side fixing nut and having the stem of each said brake shoe assembly received therein behind the cantilever, and further wherein the middle portion of each said cantilever is curved forward so that the wire connector of each said cantilever and the stem of each said brake shoe assembly are located close to each other along the extension line of said arch wire when viewed from the side.

As the second means, the present invention further comprises, in a two-wheeled vehicle brake device including a pair of right and left cantilevers pivotally carried at the rear part of a rear fork supporting a rear wheel by way of pedestals, an arch wire connected to the top ends of said cantilever pair, a longitudinally extending mount shaft inserted into and fastened to each said cantilever, and a pair of right and left brake assemblies each having a stem received by said mount shaft, the arrangement wherein said stem is located rear of the longitudinal middle of said brake shoe assembly, said mount shaft is inserted into each said cantilever from the front thereof and is fastened thereto by means of a rear-side fixing nut and having the stem of each said brake shoe assembly received therein in front of said cantilever, and further wherein the middle portion of each said cantilever is curved backward so that the wire connector of each said cantilever and the stem of each said brake shoe assembly are located close to each other along the extension line of said arch wire when viewed from the side.

In the front-wheel brake according to the present invention, when the arch wire is pulled up during braking, the right and left cantilevers are swung about the pedestals so that the brake shoes of the right and left brake assemblies are pressed against the front wheel to apply a braking force to it. Although each brake shoe assembly is subjected to a flapping effect, the stress applied to the fixing portion of the stem is small because the stem is located rearward of the middle point. Also, the wire connector of each cantilever and the stem of the brake shoe assembly are located near each other on the extension line of the arch wire instead of being far apart from each other so that, the moment developed between the two parts is also small.

The mount shaft 26 is inserted into the cantilever 18 from behind and is fastened to it by tightening the front-end fixing nut.

The same explanation applies to a rear wheel brake device.

Since the stem of the brake shoe assembly is, thus, located rearward of the longitudinal middle according to the present invention, only a small stress develops at the fixing portion of the stem during braking, making it free from overloading to prevent damage thereto. Since, in the front wheel brake, the mount shaft is inserted into the cantilever from behind to be fastened by the front-side fixing nut, 35, handling the fixing nut is easy, providing an excellent serviceability. Likewise, the mount shaft is inserted from the front into the cantilever and is fastened by the fixing nut in the rear wheel brake, ensuring a similarly improved serviceability. Furthermore, the middle portion of the cantilever is curved forward to allow the wire connector of the cantilever and the stem of the brake shoe assembly to be located near each other on the extension line of the arch wire when viewed from the side. This makes the moment developed between the wire connector and the stem during braking is small enough to ensure a satisfactory braking effect.

DESCRIPTION OF THE PREFERRED EMBODIMENTS

The preferred embodiments of the present invention are herein described with reference to the accompanying drawings.

Figure 1:
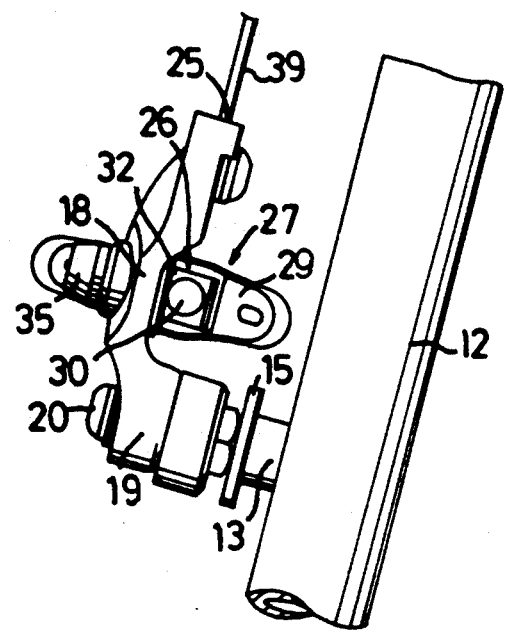
FIG. 1 is an overall side elevation showing a preferred embodiment front wheel brake device of the present invention
Figure 2:
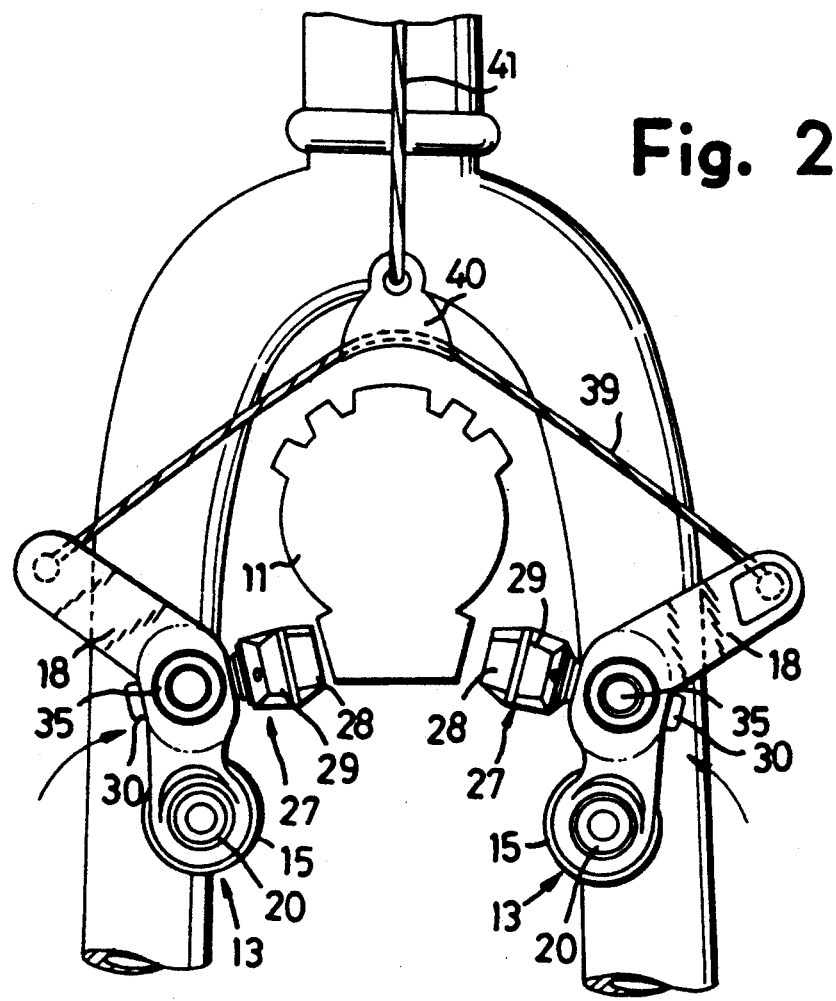
FIG. 2 is an overall front view of FIG. 1.
Figure 3:
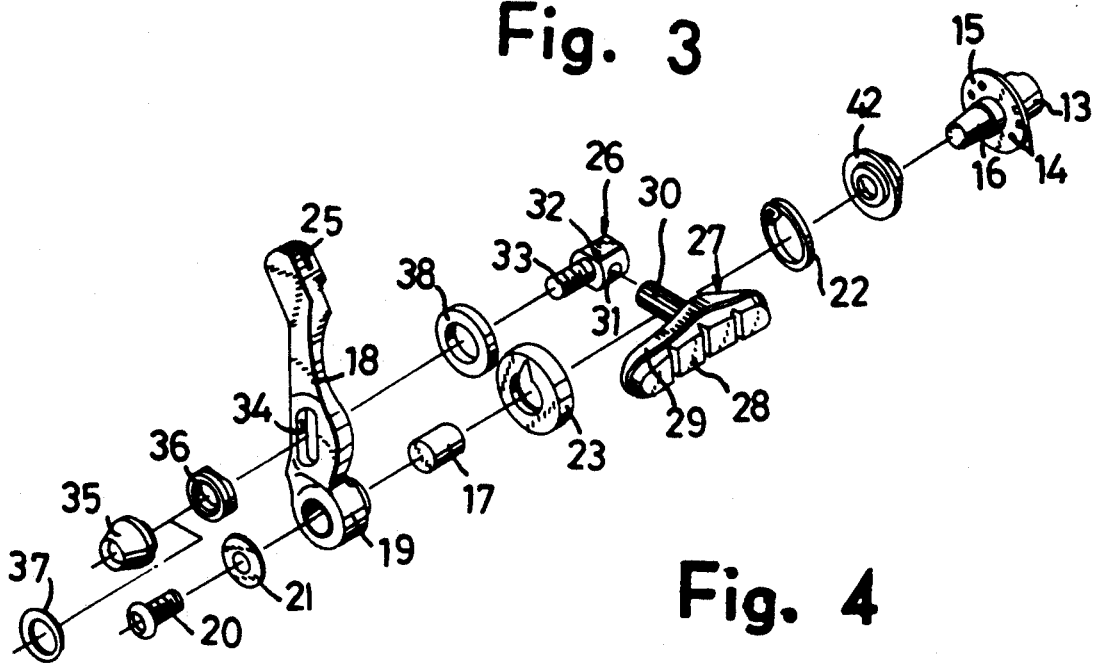
FIG. 3 is a disassembled perspective view of FIG. 1.
Figure 4:
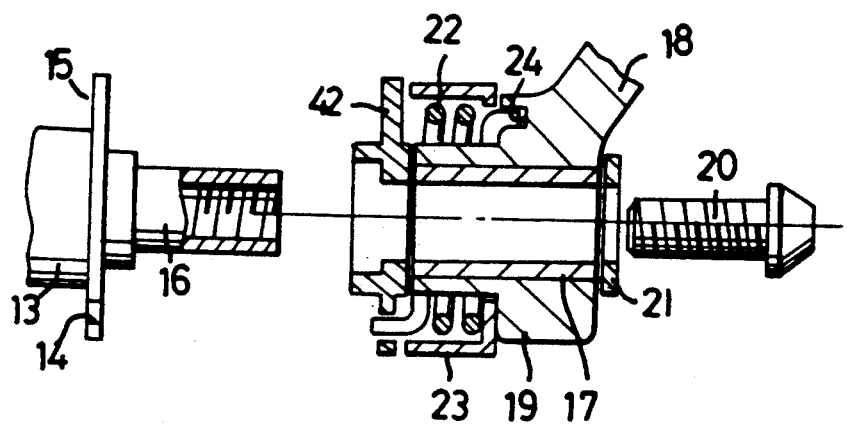
FIG. 4 a is sectional view of the portion pivotally carrying the cantilever.
Figure 5:
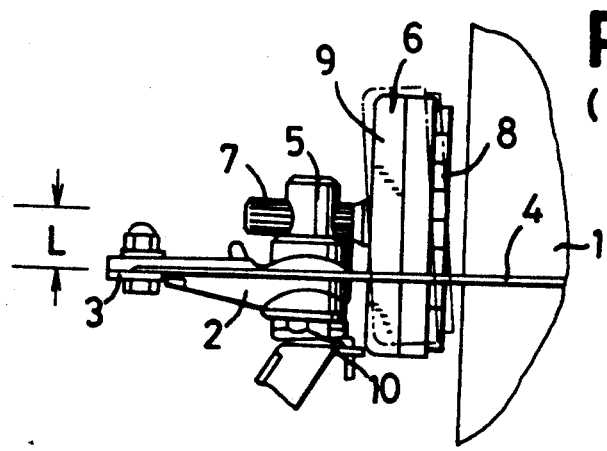
FIG. 5 is a plan view showing a prior art example.

FIGS. 1 and 2 illustrates a front wheel brake device. In FIGS. 1 and 2, numeral 11 indicates a front wheel and 12 a front fork carrying the front wheel 11. The front fork 12 has a pair of right and left pedestals 13 welded or otherwise secured to the front there. Each pedestal, as shown in FIGS. 3 and 4, is provided with a flange 15 having an adjuster hole 14 and a stud 16, around which the boss 19 of the cantilever 18 is journaled by means of a cylindrical collar 17. The boss 19 of the cantilever 18 is secured in position by means of a bolt 20 screwed into the stud 16 of the pedestal 13 through a flat washer 21. There is a return spring 22 loading the cantilever 18 provided between the boss 19 and the flange 15 of the pedestal 13. The spring 22 is of a coil type that is fitted to the cylindrical collar 17 and is protected by a spring cover 23. One end of spring 22 is received by a fitting hole 24 of the boss 19 and at the other by the adjuster hole 14 of the flange 15 so that the cantilever is spring-loaded outward. The return force for the cantilever 18 is arbitrarily adjustable by selecting the fitting position of the spring 22 with respect to the adjuster hole as desired. On the cantilever 18, the line segment interconnecting the boss 19 and the wire connector 25 is generally parallel with the front fork 12 when viewed sideways. The cantilever 18 further has a middle portion that is curved in forward direction, at which a pair of right and left brake shoe assemblies 27 are mounted by means of mount shafts 26. The cantilever 18 is generally L-shaped when viewed from front, with its upper portion beyond the middle being curved diagonally upward.

The brake shoe assembly 27 consists of a rubber shoe 28 secured to a shoe holder 29, to which the knurled stem 30 is secured at a right angle in a position displaced backward from the longitudinal middle of the brake shoe assembly 27. Each mount shaft 26 is provided with a head 32 having a hole 31 and a screw-threaded portion 33. The stem 30 of the brake shoe assembly 27 is inserted into the hole 31 of the head 32. The stud 30 of the mount shaft 26 is inserted into a slot 34 of the cantilever 18 from behind so that the head 32 carrying the stem 30 is located behind the cantilever 18. The stud is then fixedly secured to the cantilever 18 through a front washer 36 and a flat washer 37 by means of the fixing nut 35 screwed to the front end of the screw-threaded portion 33. Behind the cantilever 18, a rear washer 38 is fitted against which the stem 30 of the brake shoe assembly 27 rests for fixing during fastening the fixing nut 35. The wire connectors 25 at the top ends of the cantilever 18 interconnect the both ends of the arch wire 39 via joining parts and bolts. The arch wire 39 is connected to a brake wire 41 by means of a hanger 40 so that the center part can be pulled up during braking. The boss 19 of the cantilever 18, the wire connector 25 and the stem 30 of each brake shoe assembly 27 are located close to one another along the extension line of the arch wire 39 when viewed from the side.

Designated by numeral 42 is a washer.

In the arrangement of the brake device as described above, when a brake lever (not shown) is operated for braking, the center of the arch wire 39 is pulled up by means of the brake wire 41. The right and left cantilevers are then swung inward about the stud 16 of the pedestal 13 against the load of the spring 22, so that the brake shoes of the shoe assemblies 27 are pressed against the tire rim of the front wheel 11 for braking it.

In such braking, both brake shoe assemblies 27 are subjected to a flapping effect with which their front parts are expanded. Since, however, the stem 30 is located in a position displaced backward from the longitudinal center of the brake shoe 27 with a shorter length up to the rear end of the shoe 28, a moment developed by the flapping effect is smaller than in conventional systems. Consequently, the stress applied to the fixing part between the shoe holder 29 and the stem 30 is minimized to reduce the load applied to it, thus preventing any deformation, crack or like damage to the fixing part.

During braking, as has been described, each brake shoe 28 of the brake shoe 27 is pressed against the tire rim of the front wheel 11 by the cantilever 18 and mount shaft 26 by pulling up the arch wire 39. Since, in this arrangement, the wire connector 25 of the cantilever 18 and the stem 30 of each brake shoe assembly 27 are located close to each other on the extension line of the arch wire 39 when viewed from the side, the moment developed between the two parts is made extremely small as compared with the conventional devices. As a result, flexing of cantilever 18 is suppressed to a minimum during braking, ensuring a satisfactory braking effect.

When assembling the device with the stem 30 of the brake shoe assembly 27 inserted into the hole 31 of the mount shaft 26, the screw-threaded portion 33 of the mount shaft 26 is inserted from behind into the slot 34 of the cantilever 18. A fixing nut 35 is then screwed onto the screw-threaded portion 33 and tightened to secure the mount shaft 26 and the brake shoe assembly 27 to the cantilever 18. The mount shaft 26 is thus inserted into the cantilever 18 from behind thereof, so that a larger work space for turning the fixing nut is available for a better serviceability.

Figure 6:
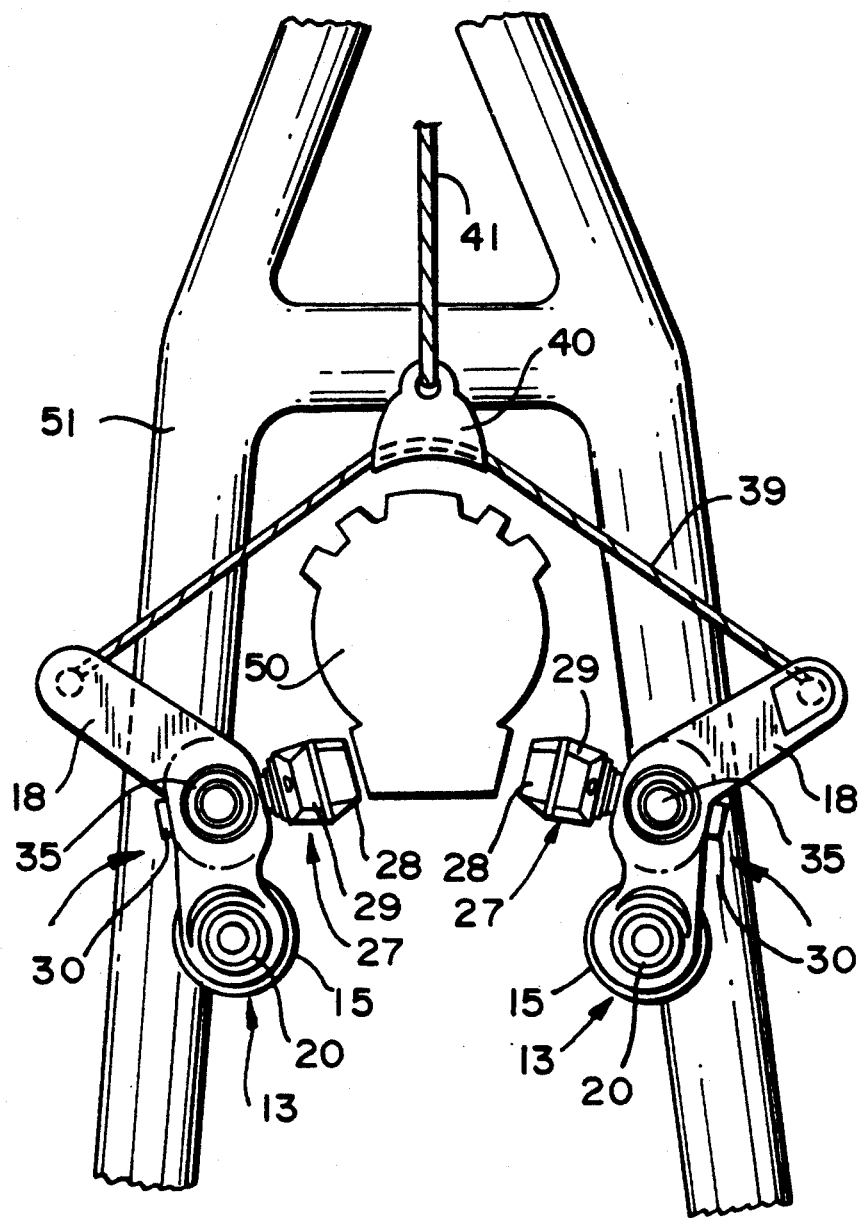
FIG. 6 is a view, corresponding to FIG. 1, of a rear wheel brake device.

The present invention is likewise applicable to a rear wheel brake. In case of a rear wheel brake, FIG. 6, a pair of right and left cantilevers 18' are pivotally carried by the rear part of a rear fork by way of pedestals 13'.

The mount shaft 26' is then inserted from the front into the cantilever 18' and fastened by a rear-side fixing nut 35'. The mount shaft 26' receives the stem 30' of the brake shoe assembly 27' in front of the cantilever 18'. The middle portion of the cantilever 18' is curved backward so that the wire connector 25' of the cantilever 18 and the stem 30 of the brake shoe assembly 27 are located close to each other on the extension line of the arch wire 39'.

What is claimed is:

1. In a two-wheeled vehicle brake device including a pair of right and left cantilevers pivotally carried at a front part of a front fork supporting a front wheel by way of pedestals, an arch wire connected to wire connectors at top ends of said cantilever pair, a longitudinally extending mount shaft inserted into and fastened to each said cantilever, and a pair of right and left brake shoe assemblies each of which has a stem received by said mount shaft, the arrangement wherein each said mount shaft is inserted into a respective said cantilever at a rear side thereof and is fastened thereto by means of a frontside fixing nut; wherein the stem of each said brake shoe assembly is retained by the stem behind the cantilever, and further wherein a middle portion of each said cantilever is curved forward relative to the top end thereof so that the wire connector of each said cantilever and the stem of each said brake shoe assembly is located along an extension line of said arch wire when viewed from a side looking axially onto an end of said stem.

2. A two-wheeled vehicle brake device as claimed in claim 1, wherein each cantilever has a boss by which said cantilever is mounted to a respective pedestal; and wherein a line segment of the cantilever connecting the boss and the wire connector is substantially parallel with the front fork when viewed from said side and is curved forward at the middle portion thereof, at which a brake shoe is mounted by means of the mount shaft.

3. In a two-wheeled vehicle brake device including a pair of right and left cantilevers pivotally carried at a rear part of a rear fork supporting a rear wheel by way of pedestals, an arch wire connected to wire connectors at top ends of said cantilever pair, a longitudinally extending mount shaft inserted into and fastened to each said cantilever, and a pair of right and left brake shoe assemblies each of which has a stem received by said mount shaft, the arrangement wherein each said mount shaft is inserted into a respective said cantilever at a front side thereof and is fastened thereto by means of a rear-side fixing nut; wherein the stem of each said brake shoe assembly is retained by the stem behind the cantilever, and further wherein a middle portion of each said cantilever is curved forward relative to the top end thereof so that the wire connector of each said cantilever and the stem of each said brake shoe assembly is located along an extension line of said arch wire when viewed from a side looking axially onto an end of said stem.

4. A brake device for a two-wheeled vehicle comprising a pair of right and left cantilevers pivotally mounted to a fork supporting a wheel by way of pedestals, an arch wire connected to an end of each cantilever via a wire connector, a right and left brake shoe assembly, each of which has a brake shoe and a stem, and a pair of mount shafts, each of which is inserted into a respective cantilever at a side thereof that faces said fork and is secured to the respective cantilever at an opposite side thereof; wherein said side of each cantilever that faces the fork is curved away from the fork in a middle portion thereof; wherein an end of each mount stem receives and retains a respective stem at the side of the respective cantilever that faces siad fork at said middle portion thereof and along a line of extension of said arch wire as viewed from a lateral side of said brake device.

5. A brake device according to claim 4, wherein each cantilever has a boss by which it is mounted to a respective pedestal, the boss being located on said line of extension along with the stem and wire connector when viewed from the lateral side of the brake device.

* * * * *